US007724545B2

(12) United States Patent
Feldtkeller

(10) Patent No.: US 7,724,545 B2
(45) Date of Patent: May 25, 2010

(54) SWITCHING CONVERTER HAVING AN ACTIVATABLE AND DEACTIVATABLE DAMPING CIRCUIT

(75) Inventor: Martin Feldtkeller, Munich (DE)

(73) Assignee: Infineon Technologies Austria AG, Villach (AT)

( * ) Notice: Subject to any disclaimer, the term of this patent is extended or adjusted under 35 U.S.C. 154(b) by 373 days.

(21) Appl. No.: 11/709,322

(22) Filed: Feb. 21, 2007

(65) Prior Publication Data

US 2008/0197818 A1 Aug. 21, 2008

(51) Int. Cl.
H02M 3/335 (2006.01)
(52) U.S. Cl. .................................. 363/21.01
(58) Field of Classification Search ................. 323/207; 363/18, 20, 21.01, 21.04, 21.07, 21.09, 21.12
See application file for complete search history.

(56) References Cited

U.S. PATENT DOCUMENTS

| 5,003,451 | A  | * | 3/1991  | Gradl et al. ............... 363/56.01 |
| 5,581,451 | A  | * | 12/1996 | Ochiai ...................... 363/21.16 |
| 6,229,288 | B1 | * | 5/2001  | Baretich et al. .............. 323/223 |
| 7,012,819 | B2 | * | 3/2006  | Feldtkeller ................ 363/21.01 |
| 7,031,173 | B2 | * | 4/2006  | Feldtkeller .................... 363/89 |
| 7,397,678 | B2 | * | 7/2008  | Frank et al. .................... 363/89 |
| 2005/0146908 | A1 | * | 7/2005 | Feldtkeller .................. 363/125 |
| 2006/0113975 | A1 | * | 6/2006 | Mednik et al. ............... 323/282 |

FOREIGN PATENT DOCUMENTS

| DE | 39 10 685 A1 | 10/1990 |
| DE | 103 55 670 B4 | 12/2005 |
| JP | 22 69469 A | 11/1990 |

OTHER PUBLICATIONS

ICB1 FL02G, Smart Ballast Control IC for Fluorescent Lamp Ballasts, Revision Date: Feb. 6, 2006, Infineon Technologies AG, 81726 Munchen, Germany.*
ICB1FL02G: Smart Ballast Control IC for Fluorescent Lamp Ballasts, Data Sheet Version 1.2, Feb. 2006, pp. 1-37, Infineon Technologies AG.

* cited by examiner

Primary Examiner—Adolf Berhane
Assistant Examiner—Yemane Mehari
(74) Attorney, Agent, or Firm—Maginot, Moore & Beck

(57) ABSTRACT

A switching converter for power factor correction which has-input terminals, an inductive storage element coupled to the input terminals, a rectifier arrangement, a control arrangement, and a damping circuit. The rectifier arrangement is connected to the inductive storage element and has output terminals for providing an output voltage. The control arrangement is configured to control a current drawn by the inductive storage element. The control arrangement is also configured to magnetize the inductive storage element during an actuation period for a magnetization time, demagnetize it for a demagnetization time, and wait a waiting time before a subsequent magnetization time. The damping circuit is coupled to the inductive storage element, and is configured to be activated and deactivated dependent at least in part on a magnetization state of the inductive storage element.

19 Claims, 6 Drawing Sheets

SWITCHING CONVERTER HAVING AN ACTIVATABLE AND DEACTIVATABLE DAMPING CIRCUIT

TECHNICAL FIELD

The invention relates to a switching converter, particularly a switching converter in the form of a power factor correction circuit or power factor controller.

TECHNICAL BACKGROUND

A power factor correction circuit is usually of a boost converter and comprises an inductive storage element, a rectifier arrangement connected to the inductive storage element, for providing an output voltage, and a switch connected to the inductive storage element. The switch controls the current drawn by the inductive storage element on the basis of the output voltage and is connected up such that the storage element absorbs energy via input terminals, and is magnetized as a result, when the switch is closed, and outputs the absorbed energy to the rectifier arrangement, and is demagnetized as a result, when the switch is subsequently opened.

A switching converter of this kind can be operated with continuous current draw or with discontinuous current draw (Discontinuous Current Mode, DCM). The mode of operation with continuous current draw is also called non-intermittent operation, whereas the mode of operation with discontinuous current draw is also called intermittent operation. In the case of non-intermittent operation, the switch is switched on again, during a demagnetization phase of the inductive storage element, when the storage element is fully demagnetized. In the case of intermittent operation, a waiting time is waited after complete demagnetization before the switch is switched on again.

A power factor correction circuit operating in intermittent mode is described in DE 103 55 670 B4.

During the waiting time after complete demagnetization of the inductive storage element and before the switch is switched on again, oscillations may occur which are caused by an LC resonant circuit which comprises the inductive storage element and parasitic capacitances, particularly a parasitic capacitance of the switch. These oscillations decay more slowly the higher the quality of the inductive storage element used.

These oscillations can result in distortions in the average current draw, which is intended to be proportional to an applied input voltage in the case of a power factor correction circuit. Depending on the phase angle of the oscillation at which the switch is switched on again, the energy absorbed by the inductive storage element may vary from actuation period to actuation period, even at a constant input voltage, which results in distortion of the current draw.

SUMMARY

A switching converter based on one embodiment of the invention comprises input terminals for applying an input voltage, an inductive storage element coupled to the input terminals, a rectifier arrangement, connected to the inductive storage element, having output terminals for providing an output voltage, and a control arrangement for controlling a current drawn by the inductive storage element, which is designed to magnetize the inductive storage element during an actuation period for a magnetization time, to demagnetize it for a demagnetization time, and to wait a waiting time before a fresh magnetization time. In addition, the switching converter has a damping circuit, coupled to the inductive storage element, which can be activated and deactivated depending on a magnetization state of the inductive storage element.

The activation and deactivation of the damping circuit on the basis of the magnetization state of the inductive storage element allows the oscillations arising during the waiting time to be damped selectively.

BRIEF DESCRIPTION OF THE DRAWINGS

Embodiments of the present invention are explained below with reference to figures. In this terminal, it should be pointed out that the figures show only the circuit components which are required for understanding the invention.

Unless indicated otherwise, identical reference symbols in the figures denote the same circuit components and signals with the same meaning.

DETAILED DESCRIPTION OF THE DRAWINGS

Figure 1:
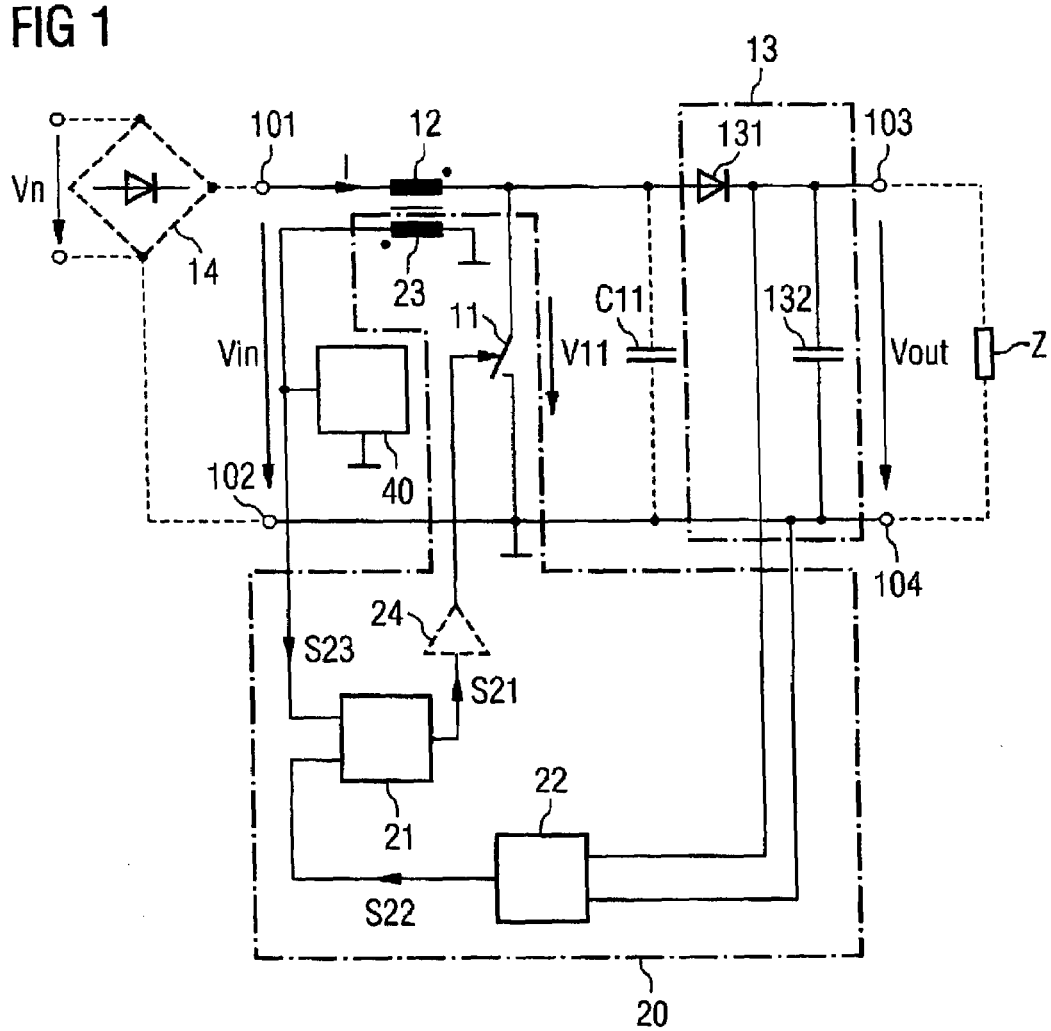
FIG. 1 shows the electrical equivalent circuit diagram for a first example of a switching converter according to an embodiment of the invention.

FIG. 1 shows an embodiment of a switching converter according to the invention. The switching converter shown is a boost converter and has input terminals 101, 102 for applying an input voltage Vin, an inductive storage element 12 and a rectifier arrangement 13 connected to the inductive storage element 12. The inductive storage element 12 and the rectifier arrangement 13 are connected in series with one another between the input terminals 101, 102 in this arrangement. In the example shown, the rectifier arrangement 13 has a series circuit with a rectifier element 131, for example a diode, and a capacitive storage element 132, for example a capacitor. An output voltage Vout of the switching converter for supplying a load Z (shown in dashes) can be tapped off at output terminals 103, 104 of the rectifier arrangement 13. In the example shown, this output voltage Vout corresponds to a voltage across the capacitive storage element 132 of the rectifier arrangement 13.

To control a current drawn by the inductive storage element 12, and hence to control the output voltage Vout of the switching converter, a control arrangement 20 is provided which is designed for periodically magnetizing the inductive storage element 12. The inductive storage element 12 in this embodiment is in the form of a storage inductor. The periodically magnetization of the inductive storage element 12 can include, for example, magnetizing it for a magnetization time, then demagnetizing it for a demagnetization time, and waiting a waiting time before fresh magnetization, respectively.

To this end, the control arrangement 20 has a switching element 11 which is connected in series with the inductive storage element between the input terminals 101, 102 and in parallel with the rectifier arrangement 13. When the switch 11 is switched on or closed, the input voltage Vin is present across the inductive storage element, and the inductive storage element absorbs energy via the input terminals 101, 102 and is magnetized as a result. When the switch 11 subsequently is switched off or opened, the inductive storage element outputs the previously absorbed energy to the rectifier arrangement 13 and is demagnetized as a result. The waiting time arises when the switch 11 remains open for a time duration which is longer than the time needed for completely demagnetizing the storage inductor 12. Over the switched-on time of the switch 11, that is to say over the magnetization time and over the waiting time between complete demagnetization of the storage inductor 12 and switching on the switch 11 again, it is possible to control the power absorption of the switching converter shown.

To actuate the switch 11, the control arrangement 20 has an actuation circuit 21 which produces an actuation signal S21 which is supplied to a control terminal of the switch 11. This switch 11 may be in the form of a MOS transistor, for example in the form of a MOSFET or IGBT. A load path or drain-source path of this MOS transistor is then connected in series with the inductive storage element 12, and a control terminal or gate terminal of the MOS transistor is supplied with the actuation signal S21 for the purpose of switching it on and off. Optionally, the control terminal of the switching element 11 and the actuation circuit 21 may have a driver circuit 24 arranged between them which is used to convert signal levels of the actuation signal S21 provided by the actuation circuit 21 to signal levels suitable for actuating the switch 11.

The actuation circuit 21 produces the actuation signal S21 for the switch 11 on the basis of a control signal S22, which is dependent on an output voltage Vout from the switching converter, and on the basis of a magnetization signal S23, which contains information about the magnetization state of the storage inductor 12. The control signal S22 is available at the output of a controller 22 which is supplied with the output voltage Vout and which compares the output voltage Vout with a reference voltage and produces the control signal S22 on the basis of this comparison. The controller 22 may have a proportional control response. In such a case, the control signal S22 is dependent on an instantaneous difference between the output voltage Vout and the reference voltage. The controller 22 may also have an integrating response, wherein the control signal S22 is dependent on the difference between the output voltage Vout and the reference voltage considered over a period in the past. In yet another case, the controller may also have a proportional integral response, wherein the control signal has a signal component dependent on the instantaneous difference between the output voltage and the reference voltage and a signal component which is dependent on the difference in the past. The control signal S22 is used to set the switched-on time of the switch 11 and hence the magnetization time and/or set the waiting time with the aim of keeping the output voltage Vout at least approximately constant over time. If the control signal S22 indicates a falling output voltage Vout, which may be caused by increased power absorption by the load Z, for example, then the actuating circuit 21 increases the switched-on time of the switch 11 per actuation period and/or shortens the waiting time in order to increase the power absorption as a result and to counteract the fall in the output voltage Vout. If the output voltage rises then the actuating circuit decreases the switched-on time per actuation period and/or increases the waiting time in order to reduce the power absorption and to counteract the rise in the output voltage Vout.

In the example shown, the magnetization signal S23 corresponds to a voltage across an auxiliary coil 23 which is coupled to the storage inductor 12 inductively. This voltage across the auxiliary coil 23 changes its polarity at the time at which the storage inductor 12 is completely demagnetized at the end of the demagnetization time. This information about the time of complete demagnetization of the storage inductor 12 is used in the actuating circuit 21 in order to ascertain the waiting time between the complete demagnetization of the storage inductor 12 and the switch 11 being switched on again, i.e. fresh magnetization.

The manner of operation of the boost converter operating in intermittent mode which is shown in FIG. 1 is explained below with reference to FIG. 2, which shows time profiles for a voltage V11 across the switch 11, for the current I in the inductive storage element 12 and for the actuation signal S21. Consideration will first of all be given to a period between times t0 and t3, which denotes the length of an actuation period Tp of the switch 11 or of the switching converter. This actuation period Tp can be divided into three time spans, a magnetization time T1, a demagnetization time T2, coming after the magnetization time T1, and a waiting time T3, which follows the demagnetization time T2. The switching element 11 is on during the magnetization time T1. The input current I rises linearly during this magnetization time T1, with the following being true of a change dI/dt in the input current over time during this demagnetization time:

$$dI/dt = Vin/L \qquad (1)$$

In this context, L denotes the inductance of the storage inductor 12. In this connection, it should be noted that the current profile I also corresponds to the magnetization profile B of the storage inductor. The switching element 11 is switched off at the end of the magnetization time. This demagnetizes the storage inductor 12, and the input current I falls linearly starting from the previously reached peak value. The following is true of a change dI/dt in this current I over time during this demagnetization time T2:

$$dI/dt = (Vin - Vout)/L \qquad (2)$$

The demagnetization time T2 ends at the time at which the storage inductor 12 is completely demagnetized and the current I is therefore 0. If the switching element 11 is not immediately switched on again when the storage inductor 12 is completely demagnetized, but rather the demagnetization time T2 is followed by a waiting time T3, then what are known as inductor oscillations occur which are caused by an LC resonant circuit which comprises the inductance of the storage inductor 12 and a parasitic capacitance C11. This parasitic capacitance C11 is particularly a parasitic capacitance of the switching element 11. When a MOS transistor is used as the switching element, this parasitic capacitance is the drain/source capacitance of the MOS transistor.

Idealistically assuming that the average value of the current during the waiting time T3 is equal to zero, the following is true for the average value Im of the current I per actuation cycle or per actuation period:

$$Im = (Vin \cdot T1)/[2 \cdot L(l+p)] \qquad (3)$$

In this context, p denotes the proportionality factor between the waiting time T3 and the sum of the magnetization and demagnetization times T1, T2:

$$p = T3/(T1+T2) \quad (4)$$

The control concept described herein, in which the switched-on time and/or the waiting time is set on the basis of the output voltage Vout, works both for a DC voltage as the input voltage Vin and for a periodically varying input voltage Vin. Thus, the boost converter shown in FIG. 1 can be operated particularly as a power factor correction circuit (power factor controller, PFC). A power factor controller of this kind is a boost converter which is supplied with a periodically varying voltage as input voltage Vin and which produces a DC voltage as output voltage Vout. In this case, the input voltage Vin is a voltage in the form of the magnitude of a sine wave, which voltage is produced by means of a bridge rectifier 14 from a sinusoidal mains voltage Vn, for example.

To minimize the reactive-power absorption from the network, such power factor controllers have the requirement that their input current I averaged over one actuation period of the switch 11 is approximately proportional to the input voltage Vin. It is known, and can be shown with reference to equation (3) that a boost converter operating in intermittent mode meets this condition if the waiting time is proportional to the sum of the magnetization time and demagnetization time of the storage inductor 12 and if it is assumed that the magnetization time changes only slowly in comparison with the period length of the input voltage Vin and that the proportionality factor between the waiting time and the sum of the magnetization time and demagnetization time changes only slowly in comparison with the period length of the input voltage Vin. As already explained, this switched-on time and the proportionality factor are parameters for controlling the power absorption of the boost converter and hence for controlling the output voltage Vout.

Assuming that the input voltage Vin changes slowly in comparison with the length Tp of an actuation cycle and assuming that the control signal S22 changes slowly in comparison with the length of an actuation cycle Tp and that the switched-on time T1 thus changes slowly or the proportionality factor p changes slowly, it is thus true that the average value of the current draw per actuation cycle is proportional to the instantaneous value of the input voltage Vin, as demanded for power factor controllers.

Figure 2:
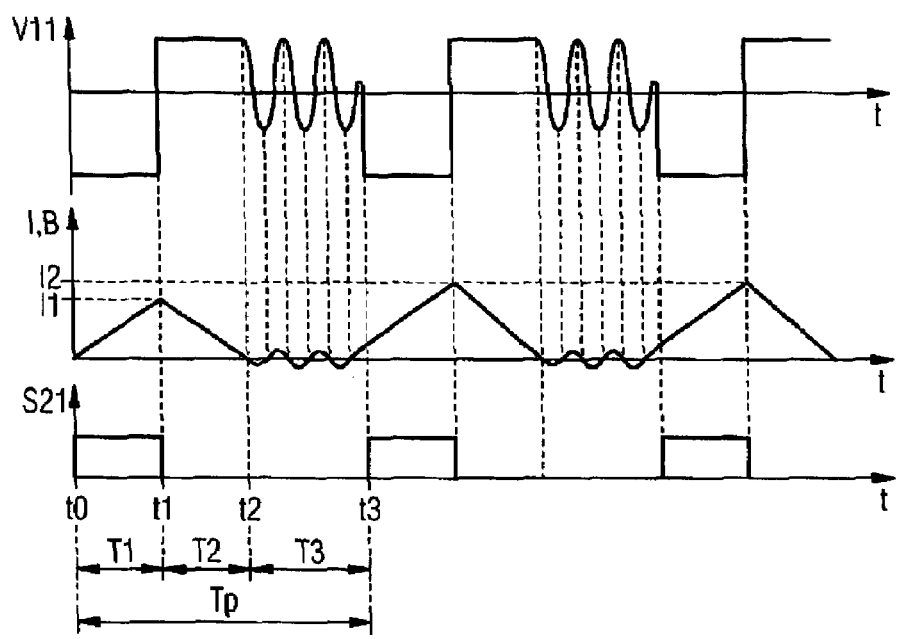
FIG. 2 shows signal profiles for a first time sequence illustrating the function of a conventional switching converter which does not have a damping circuit, and which operates in intermittent mode.

In high-quality storage inductors, the parasitic oscillation decays only slowly during the waiting time T3 and, as shown in the further profile in FIG. 2, may result in distortions in the current draw. If the switch 11 is switched on again at the start of another actuation period, for example, at a time at which the oscillation reaches its maximum, then the inductor current I starts to rise not from zero but rather from this maximum value during the magnetization time. For a magnetization time which is the same in comparison with the previous actuation period, the inductor current therefore reaches a higher peak value during the further actuation period, as a result of which the current draw during this actuation cycle increases as a whole.

Figure 3:
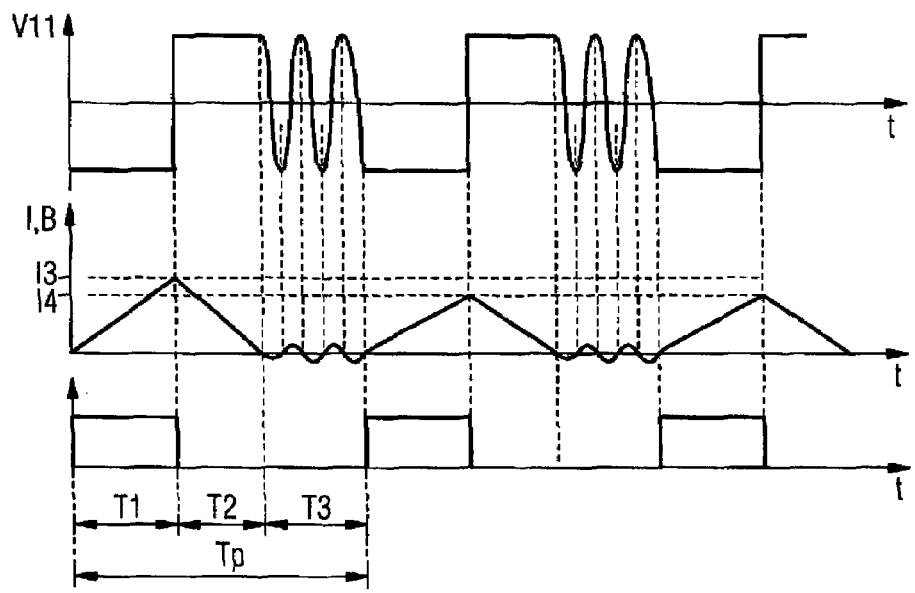
FIG. 3 shows signal profiles for a second time sequence illustrating the manner of operation of a conventional switching converter which does not have a damping circuit and which operates in intermittent mode.

Another scenario is shown in FIG. 3. After a first actuation period, in which the inductor current starts to rise from zero within the magnetization time T1, the switching element 11 is switched on at the start of a subsequent actuation period at a time at which the parasitic oscillation reaches a (negative) minimum value. The inductor current starts to rise from this minimum value during the magnetization time and reaches a lower peak value in the case of a magnetization time which is the same in comparison with the previous actuation period. The current draw during the subsequent actuation period therefore decreases in comparison with the previous actuation period.

Figure 4:
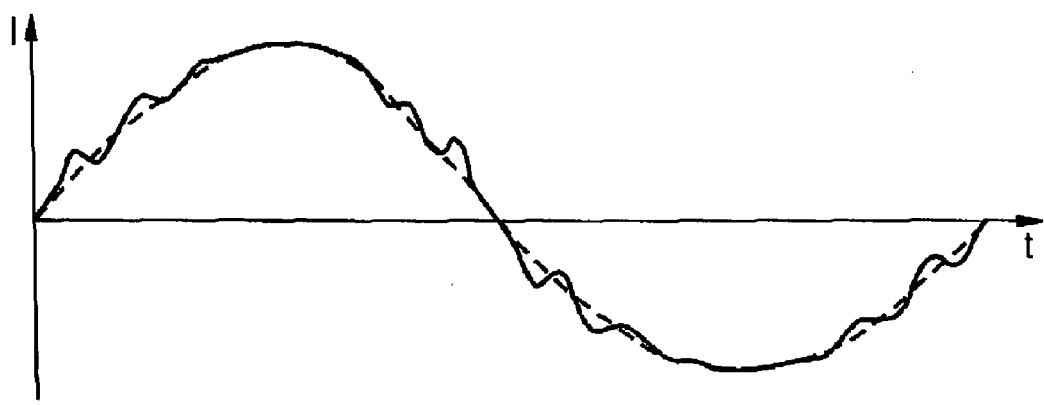
FIG. 4 shows a timing diagram of the current drawn by a conventional switching converter for a sinusoidal input voltage.

Depending on the phase angle of the parasitic oscillation when the switch is switched on again, the current draw may therefore be distorted if no additional measures are taken to damp these parasitic oscillations. FIG. 4 schematically shows such a distorted mains input current In, averaged over a respective actuation period, for a sinusoidal mains voltage Vn. FIG. 4 shows the desired undistorted, and hence sinusoidal, current draw in dashes.

For the purpose of damping the parasitic oscillations during the waiting time T3 and hence for the purpose of reducing the previously explained distortion of the current draw, the switching converter shown in FIG. 1, is provided with a damping circuit 40 which is coupled to the storage inductor 12 inductively and which can be activated and deactivated on the basis of a magnetization state of the storage inductor 12. The damping circuit 40 is inductively coupled to the storage inductor 12 in the case of the switching converter shown in FIG. 1 via the auxiliary coil 23 of the control arrangement 20. To this end, the damping circuit 40 is connected to one of the terminals of the auxiliary coils 23 and can, in particular, be connected in parallel with the auxiliary coil 23.

Figure 5:
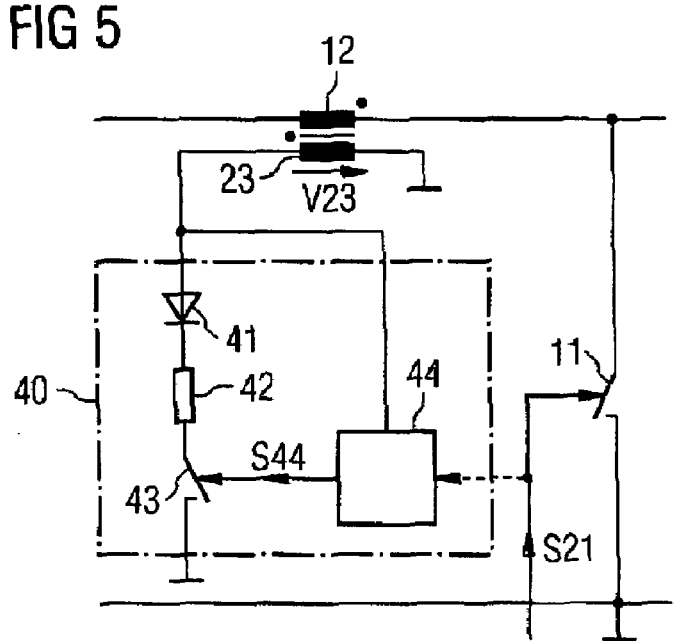
FIG. 5 shows an example of the damping circuit, which has a damping element and an activation circuit for the damping element.

An embodiment of the damping circuit 40 is shown in FIG. 5. To give a better understanding, FIG. 5 also shows, besides the damping circuit 40, the storage inductor 12, the auxiliary coil 23, and the switching element 11 of the control arrangement. The damping circuit 40 shown has a damping element 42 which is connected in series with the auxiliary coil 23. In this arrangement, the series circuit comprising the auxiliary coil 23 and damping element 42 is connected between terminals for an identical supply potential, for example reference-ground potential. By way of example, the damping element 42 is in the form of a nonreactive resistor 42 and can be activated and deactivated by a deactivation circuit 43, 44. In the example, the activation circuit comprises a switching element 43 connected in series with the damping element 42 and also an activation circuit 44 for the switching element 43. When the switch 43 is closed, the damping element 42 is activated. When the damping element 42 is activated, a current flows from the auxiliary coil 23 via the damping element 42, as a result of which energy is taken from the auxiliary coil 23 and, owing to the inductive coupling between the auxiliary coil 23 and the storage inductor 12, from the storage inductor 12. To damp parasitic oscillations effectively using the damping circuit 40, but not to increase the power loss to any great extent in the boost converter, provision is made for the damping circuit 40 to be activated at least intermittently during the waiting time T3, but for it to be deactivated at least intermittently during the demagnetization time T2. Permanent activation of the damping circuit 40 during the demagnetization time T2 could contribute to a not insubstantial increase in the power loss.

Accordingly, the activation circuit 44 is designed to close the switch 43 at least intermittently during the waiting time T3 and to open the switch 43 at least intermittently during the demagnetization time. To this end, the activation circuit 44 is supplied with a piece of information about the instantaneous magnetization state of the auxiliary coil 23, with the instantaneous magnetization state of the auxiliary coil 23 representing the instantaneous magnetization state of the storage inductor 12. In the case of the damping circuit 40 shown in FIG. 5, the piece of information supplied directly to the activation circuit 44 about the magnetization state of the auxiliary coil 23, and hence of the storage inductor 12, is the voltage V23 which is present across the auxiliary coil 23.

Figure 6:
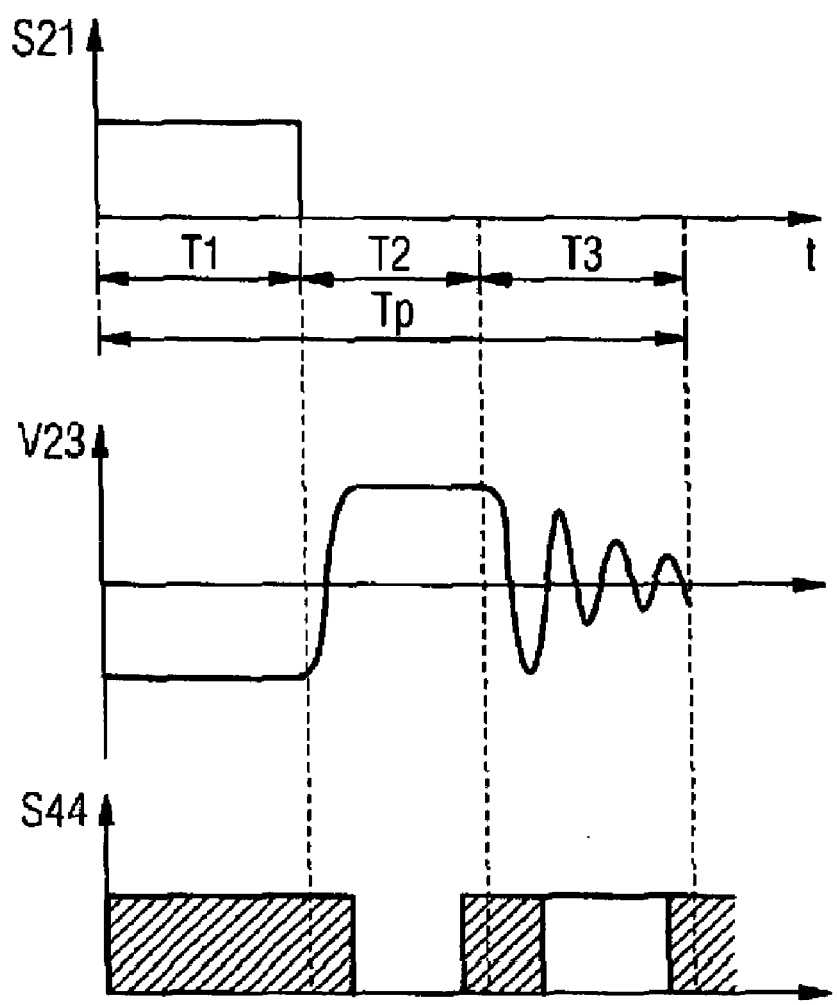
FIG. 6 shows signal profiles illustrating the operation of the damping circuit shown in FIG. 5.

The manner of operation of the damping circuit 40 shown in FIG. 5 is explained below with reference to the signal profiles in FIG. 6. FIG. 6 shows time profiles for the actuation signal S21 of the switch 11, for the voltage across the auxiliary coil 23 and for the activation signal S44, which actuates the switch 43 connected in series with the damping element 42.

For the purposes of explanation, it will be assumed that the poles of the auxiliary coil 23 are connected relative to the storage inductor 12 such that a voltage on the terminal to which the dumping circuit 40 is connected is negative relative to the reference-ground potential on the other terminal of the auxiliary coil 23 during the magnetization time T1 of the storage inductor 12. At the end of the magnetization time and at the start of the demagnetization time, this voltage changes its polarity and remains at a positive value until the end of the demagnetization time T2. During the waiting time T3, the voltage V23 oscillates in line with the inductor oscillations between positive and negative values. The activation circuit 44 is designed to activate the switch 43 at least intermittently during the waiting time T3, which is symbolized in FIG. 6 by a High level of the actuation signal S44, and to deactivate it at least intermittently during the demagnetization time T2, which is symbolized in FIG. 6 by a Low level of the actuation signal S44. The shaded areas in FIG. 6 symbolize time periods during which the actuation signal S44 can switch the switch 43 either on or off. Particularly effective damping of the oscillations for a particularly low power loss can be achieved especially if the damping circuit is activated throughout the waiting time T3 and is deactivated throughout the demagnetization time T2.

With reference to FIG. 5, there is optionally the possibility of connecting a rectifier element 41 in series with the damping element 42. This rectifier element 41, which is in the form of a diode, for example, allows a flow of current through the damping element 42 only for one of the two possible polarities of the oscillation. In the example shown, the rectifier element 41 is connected up such that a flow of current through the damping element 42 is possible only for positive polarity of the voltage V23 across the auxiliary coil 23.

The diode 41 can be omitted if the switch 43 is safely off during the magnetization time. What is needed in this case is a bidirectional switch, that is to say a switch which is able, under the control of the signal, to be off both for positive and for negative voltages V23 across the auxiliary coil 23. This could increase the damping effect further.

Figure 7:
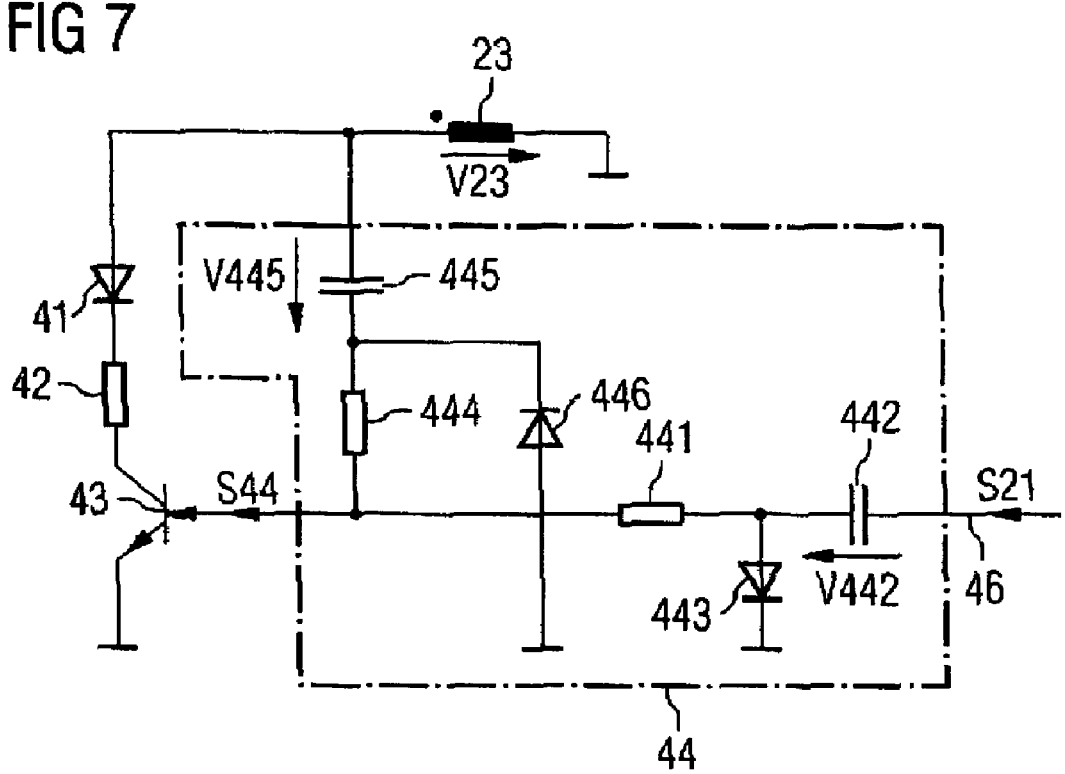
FIG. 7 shows a first example of the activation circuit.

A first embodiment of a damping circuit 40 with an activation circuit 44, which has a functionality explained with reference to FIG. 6 is shown in FIG. 7. In the case of this damping circuit, the switching element 43 for activating the damping element 42 is in the form of a transistor, in the example in the form of an npn bipolar transistor. In this terminal, it should be pointed out that instead of a bipolar transistor, it is naturally also possible to use a MOS transistor, particularly an n-channel MOSFET. The load path of the transistor 43 shown is connected between the damping element 42 and reference-ground potential. The transistor 43 is on when the actuation signal S44 produced by the activation circuit 44 assumes a signal level which, taking the reference-ground potential as a reference, is above the threshold voltage of the transistor 43.

In the case of the activation circuit 44 shown in FIG. 7, the actuation signal S44 is produced on the basis of the magnetization state of the auxiliary coil 23 and on the basis of the actuation signal S20 for the switch (11 in FIG. 1) of the switching converter. The activation circuit shown has two series circuits comprising a resistor element 441, 444 and a capacitive storage element 442, 445, respectively. In this case, a first series circuit is connected between a first input 46 of the activation circuit, which is supplied with the actuation signal S20, and the control terminal of the transistor 43, and a second series circuit 444, 445 is connected between a second terminal 47, which is connected to the auxiliary coil 23, and the control terminal of the transistor 43. In this arrangement, the resistor elements 441, 444 in the series circuits are respectively connected between the control terminal of the transistor 43 and the capacitive storage element 442, 445 in the respective series circuit. A first rectifier element 443 is connected between a node which is common to the capacitive storage element 442 and to the resistor element 441 in the first series circuit and reference-ground potential, while a second rectifier element 446, for example a diode, is connected between a node which is common to the capacitive storage element 445 and to the resistor element 444 in the second series circuit and reference-ground potential. In the example shown, the first rectifier element 443 is connected up such that, when the signal level of the actuation signal S20 is positive with respect to reference-ground potential, the first capacitive storage element 442 can charge to a voltage corresponding to this signal level. The second rectifier element 446 is connected up such that, when the voltage V23 across the auxiliary coil 23 is negative with respect to reference-ground potential, the second capacitive storage element 445 can charge to a voltage corresponding to this negative auxiliary coil voltage V23.

The manner of operation of the damping circuit shown in FIG. 7 is explained below:

Consideration will first of all be given to the magnetization time, during which the actuation signal S21 assumes a positive signal value and the auxiliary coil voltage V23 assumes a negative signal value, with reference to FIG. 6. The first capacitive storage element 442 therefore has a positive voltage V442 across it, and the voltage across the first rectifier element 443 is at least approximately zero in the steady state, so that a signal level suitable for switching on the transistor 41 does not result from the actuation signal S20 during the magnetization time T1. With reference to FIG. 6, the auxiliary coil voltage V23 has a negative signal level during the magnetization time T1. A voltage V445 across the second capacitive storage element is accordingly negative. In this case, a voltage across the second rectifier element 446 is at least approximately zero, so that a signal level suitable for switching on the transistor 43 does not result from the auxiliary coil voltage V23 either. The transistor 43 is therefore off during the magnetization time T1, and the damping element 42 is therefore deactivated. If there is a diode 41 in series with the switch 43 then merely this diode 41, which is off during the magnetization time as a result of the negative auxiliary voltage V23, ensures that the damping element 42 is deactivated during the magnetization time.

At the end of the magnetization time T1, the actuation signal S21 has a falling edge, which lowers the electrical potential on the common node between the capacitive storage element and the resistor element 441, 442 by a value which corresponds to the signal swing of the actuation signal S21. The electrical potential on this common node becomes negative as a result. At the end of the magnetization time T1, the auxiliary coil voltage V23 has a rising edge, which raises the electrical potential on the node which is common to the capacitive storage element 445 and to the resistor element 444 by a value which corresponds to the signal swing of the auxiliary coil voltage V23. The electrical potential on this common node therefore assumes the positive signal value. In the case of this activation circuit 44, the resistor elements 441, 444 are tuned to one another such that the negative potential on the common node in the first series circuit 441, 442 "dominates" the positive potential on the common node in the second series circuit 444, 445, so that the electrical potential on the actuation terminal of the transistor 43 is not sufficient to switch on the transistor 43. These different potentials on the common node in the first series circuit 441, 442 and on the common node in the second series circuit 444, 445 also result in a flow of current via the resistors 441 and 444 and, subsequently, in a rise in the potential on the common node in the first series circuit 441, 442 and in a fall in the potential on the common node in the second series circuit 444, 445, until the two potentials have become more alike. The value to which these two potentials adjust themselves in this context is dependent on the capacitance ratio of the capacitive storage elements 442 and 445. This capacitance ratio is chosen, taking account of the signal swings of the actuation signal S21 and the auxiliary voltage V23, such that the transistor 43 therefore also remains off during the demagnetization time T2.

The first capacitive storage element 442 and the rectifier element 443 connected thereto and the second capacitive storage element 445 and the rectifier element 444 connected thereto work as charge pumps, among which the first charge pump 442, 443 "pumps" a negative charge via the resistor 441, in the direction of the actuation terminal of the transistor 43 for a falling edge of the actuation signal, and among which the second charge pump pumps a positive charge via the resistor 444 in the direction of the actuation terminal 43 of the transistor 43 for a rising edge of the auxiliary coil voltage V23. In this context, the parameters of the individual components in the series circuits are in tune with one another such that the negative charge in the case of a pumping operation in the first charge pump 442, 443 compensates for the positive charge in the case of a pumping operation in the second charge pump 445, 446 to the extent that the transistor 43 remains off.

At the end of the demagnetization time, the auxiliary coil winding V23 has a falling edge, as a result of which the second capacitive storage element 445 is discharged, or is charged to a negative voltage. Upon a subsequent rising edge of the auxiliary coil voltage V23, positive charge is again "pumped" in the direction of the actuation terminal of the transistor 43, whereas no further negative charge is delivered by the first series circuit. The positive charge in the second series circuit therefore compensates for the previously delivered negative charge in the first series circuit, as a result of which the transistor 43 is switched on upon the first rising edge of the oscillation in the auxiliary coil voltage V23. Upon every positive edge of the oscillation, charge is then subsequently delivered to the control terminal of the transistor 43. In this terminal, it should be pointed out that instead of the bipolar transistor 43 shown in FIG. 7 it is also possible to use a MOSFET.

The transistor 43 is switched off at the start of a subsequent magnetization time, but no later than in the course of this magnetization time, when the potentials on the common nodes fall to approximately zero in the manner explained above. When the transistor 43 is not deactivated until during the magnetization time, the rectifier element 41 prevents activation of the damping element 42 and therefore prevents an increase in the power loss during the magnetization time as a result of the damping circuit.

The damping circuit 40 shown may be in the form of an integrated circuit, particularly together with the circuit components of the control arrangement (reference symbol 20 in FIG. 1) in a common integrated circuit. With reference to FIG. 1, the damping circuit 40 for damping the inductor oscillations may be connected, particularly to the terminal of the integrated circuit via which the magnetization signal S23 is supplied from the auxiliary coil 23. Additional terminals of the integrated circuit can then be dispensed with.

Figure 8:
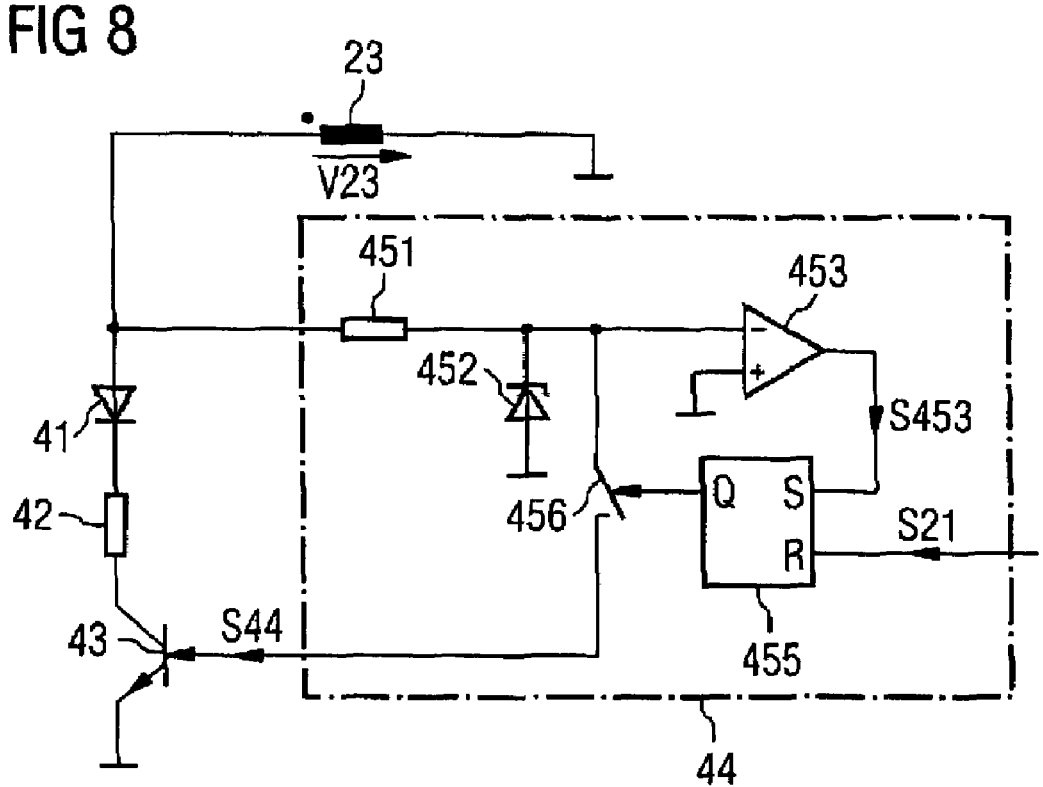
FIG. 8 shows a second example of the activation circuit.

Another embodiment of a damping circuit is shown in FIG. 8. The actuation signal S44 for actuating the switch 43, which is in the form of an npn bipolar transistor in the example, is derived directly from the auxiliary coil voltage V23 in this case. To this end, the control terminal of the transistor is connected via a series resistor 451, which is used to limit the control current and via a further switching element 451 to the terminal of the auxiliary coil 23 which is remote from the reference-ground potential. In the example, a zener diode 452 connected between the series resistor 451 and reference-ground potential is used to limit the auxiliary coil voltage V23 supplied to the activation circuit 44. In the case of this activation circuit 44, the actuation of the transistor 43 via the auxiliary coil voltage V23 causes the transistor 43 to be on only for positive signal values of the auxiliary coil voltage V23, and hence causes the damping element 42 to be activated only for positive signal values of the auxiliary coil voltage 23. To prevent activation of the transistor 43 during the demagnetization time T2, during which the auxiliary coil voltage V23 likewise assumes positive signal values, the switch 456 is provided, which is actuated on the basis of the actuation signal S21 for the switching converter switch (11 in FIG. 1) and on the basis of the magnetization state of the auxiliary coil 23. To this end, the activation circuit 44 has a flipflop, in the example an RS flipflop, whose Reset input R is supplied with the actuation signal S21 and whose Set input S is supplied with a zero crossing signal S454 produced by a zero crossing detector 453, 454.

For the explanation which follows, it will be assumed that the switch 456 is on when the flipflop has been set and that it is off when the flipflop has been reset. The flipflop 455 is reset upon a rising edge of the actuation signal S21 and hence at the start of the magnetization time, as a result of which the switch 456 is opened and actuation of the switch 43 activating the damping element 42 is prevented. The flip-flop is set and hence the switch 456 is switched on upon a first zero crossing in the auxiliary coil voltage V23 with a falling edge, that is to say, with reference to FIG. 6, with the first zero crossing in the auxiliary coil voltage V23 after the end of the demagnetization time. This ensures that the switch 456 is safely off during the demagnetization time.

By way of example, the zero crossing detector 453 comprises a comparator 453 which compares the auxiliary coil voltage V23 with reference-ground potential and which, depending on whether this voltage is above or below the reference-ground potential, provides a High level or a Low level at its output. An output signal S453 from this comparator is supplied to an edge-controlled Set input S of the flipflop 455. In this context, the comparator 453 and the flipflop 455 are in tune with one another such that the flipflop 455 is set upon an edge of the comparator signal S453 which results from a zero crossing in the auxiliary voltage V23 during a falling edge. To this end, the flipflop 455 is one controlled by positive edges, for example which is set upon a rising edge of the signal at the Set input. In this case, the comparator 453 produces the comparator signal S453 such that it has a High level for a negative auxiliary voltage.

Optionally, the damping circuit shown in FIG. 8 has a diode 41 connected in series with the switch 43, said diode being connected up such that it is off during the magnetization time, i.e. in the present case when there is a negative auxiliary voltage V23. The provision of such a diode 41 may be necessary when the switch 43 used has different off-state properties depending on the polarity of the applied voltage, i.e. with reference to the illustrated example when the switch 43 has a lower withstand voltage for a negative auxiliary voltage V23 than for a positive voltage. Such switches with different off-state properties usually include bipolar transistors.

For the embodiments explained above, it is assumed that the damping circuit 40 is coupled to the storage inductor 12 inductively via an auxiliary coil 23 which is present in the control arrangement 20 anyway.

Figure 9:
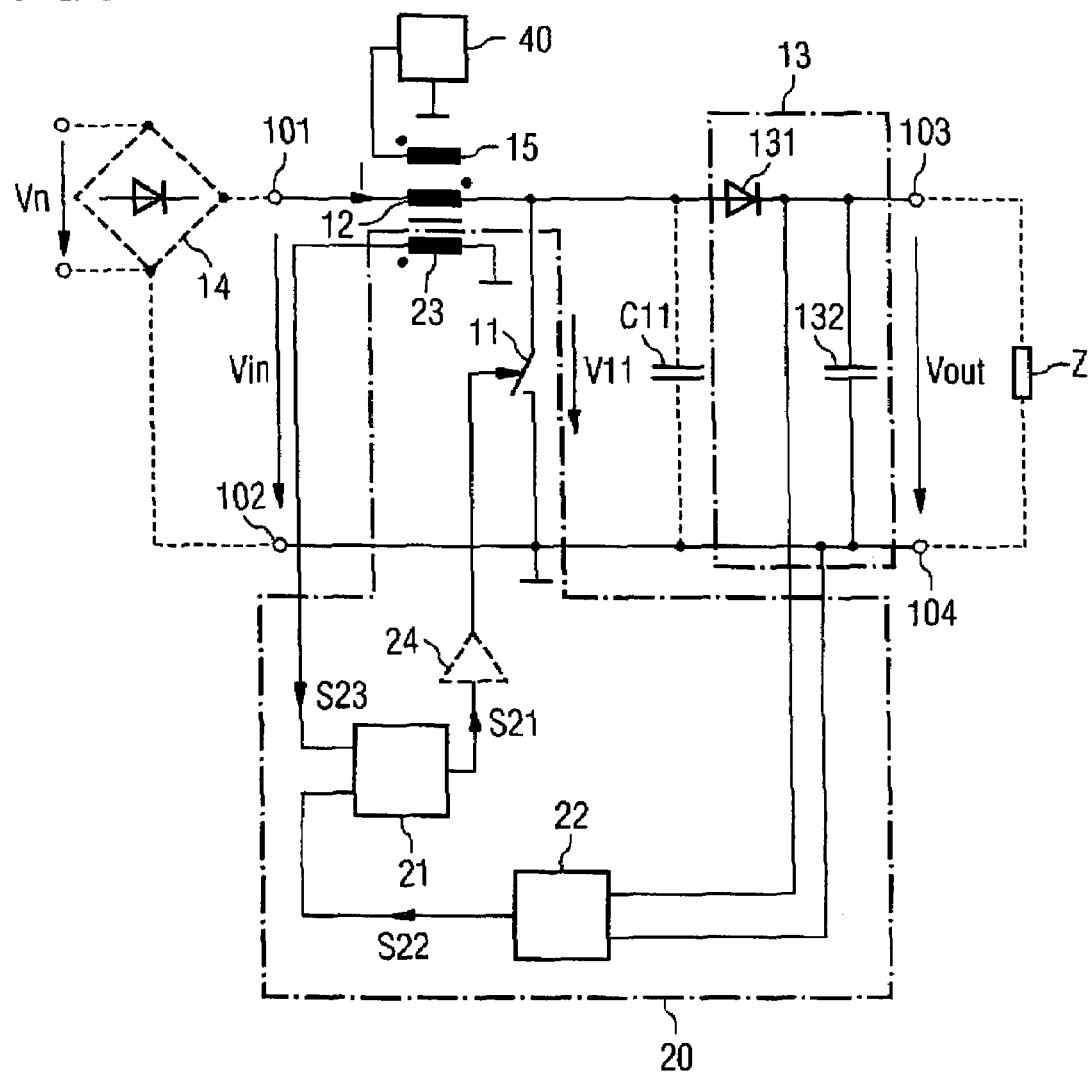
FIG. 9 shows a second example of an inventive switching converter.

With reference to FIG. 9, it is naturally also possible to provide a separate auxiliary coil which is used only to couple the damping circuit 40 to the storage inductor 12 inductively. This separate auxiliary coil is denoted by the reference symbol 15 in FIG. 9. A separate auxiliary coil 15 of this kind may be necessary particularly for control arrangements which do not require an auxiliary coil for detecting the magnetization state of the storage inductor.

It is also possible (not shown in more detail) to connect the damping circuit 40 to the storage inductor 12 directly. In this case, the circuit components which need to be used for the damping circuit are circuit components with a high withstand voltage however. In addition, the damping circuit may also be coupled to the inductive storage element capacitively (not shown in more detail).

In summary, the damping circuit may be coupled to the inductive storage element in any way. In particular, the damping circuit may be coupled or connected to the inductive storage element directly or may be coupled to the inductive storage element via a potential barrier, for example an inductive or capacitive potential barrier.

The invention claimed is:

1. A switching converter for power factor correction comprising:
    input terminals for receiving an input voltage,
    an inductive storage element coupled to at least one of the input terminals,
    a rectifier arrangement, connected to the inductive storage element, having output terminals for providing an output voltage,
    a control arrangement configured to control a current drawn by the inductive storage element, the control arrangement configured to magnetize the inductive storage element during an actuation period for a magnetization time, demagnetize inductive storage element for a demagnetization time, and wait a waiting time before a subsequent magnetization time,
    a damping circuit including a damping element inductively coupled to the inductive storage element, configured to be activated and deactivated dependent at least in part on a magnetization state of the inductive storage element, the damping circuit being adapted in its activated state to draw energy from the inductive storage element.

2. The switching converter as claimed in claim 1, wherein the control arrangement includes a first auxiliary coil inductively coupled to the inductive storage element, and wherein the damping circuit is connected to the first auxiliary coil.

3. The switching converter as claimed in claim 1, wherein the control arrangement includes a first auxiliary coil inductively coupled to the inductive storage element, and further comprising a second auxiliary coil inductively coupling the damping circuit to the inductive storage element.

4. The switching converter as claimed in claim 1, wherein the damping circuit includes a damping element and an activation circuit configured to selectively activate the damping element.

5. The switching converter as claimed in claim 1, wherein the control arrangement is configured to set the magnetization time based at least in part on the output voltage and to set the waiting time at least approximately proportionally to the sum of the magnetization time and the demagnetization time.

6. The switching converter as claimed in claim 3, wherein the activation circuit has:
    a switching element having a control terminal which is connected to the first or second auxiliary coil via a further switching element,
    a further actuation circuit for the further switching element, comprising a zero crossing detector which is supplied with a voltage dependent on the voltage across the inductive energy storage element.

7. The switching converter as claimed in claim 4, wherein the activation circuit is configured to activate and/or deactivate the damping element on the basis of a voltage across the inductive storage element.

8. The switching converter as claimed in claim 4, wherein the activation circuit is configured to deactivate the damping element at least intermittently during the demagnetization time of the inductive storage element.

9. The switching converter as claimed in claim 4, wherein the activation circuit is designed to activate the damping element at least intermittently during the waiting time.

10. The switching converter as claimed in claim 7, wherein the activation circuit is supplied with a voltage representative of the voltage across the inductive storage element via an auxiliary coil that is coupled inductively to the inductive storage element.

11. The switching converter as claimed in claim 7, wherein the control arrangement has a switching element which is connected to the inductive storage element and which is actuated by a switch actuation signal, and wherein the activation circuit is designed to activate and/or deactivate the damping element based at least in part on the switch actuation signal.

12. The switching converter as claimed in claim 11, wherein the activation circuit is configured to activate the damping element on the basis of the voltage across the inductive energy storage element and to deactivate it on the basis of the switch actuation signal.

13. The switching converter as claimed in claim 11, wherein the activation circuit has:
    a switching element having a control terminal,
    a first charge pump which is actuated by the switch actuation signal and which is connected to the control terminal of the switching element via a first resistor element,
    a second charge pump which is actuated by a voltage dependent on the voltage across the inductive energy storage element and which is connected to the control terminal via a second resistor element.

14. The switching converter as claimed in claim 13, wherein each of the first and second charge pumps respectively include a capacitive storage element and a rectifier element.

15. The switching converter as claimed in claim 14, wherein each of the capacitive storage elements of the first and second charge pumps is connected in series with a respective one of the first and second resistor elements.

16. The switching converter as claimed in claim 15, wherein the capacitive storage elements and the respective first and second resistor elements form respective first and second series circuits having at least approximately the same time constants.

17. A switching converter for power factor correction comprising:
    input terminals for receiving an input voltage,
    an inductive storage element coupled to at least one of the input terminals, a rectifier arrangement, connected to the inductive storage element, having output terminals for providing an output voltage, a control arrangement configured to control a current drawn by the inductive storage element, the control arrangement configured to magnetize the inductive storage element during an actuation period for a magnetization time, demagnetize the inductive storage element for a demagnetization time, and wait a waiting time before a subsequent magnetization time, a damping circuit including a damping element inductively coupled to selectively and controllably remove energy from the inductive storage element based at least in part on a magnetization state of the inductive storage element.

18. The switching converter as claimed in claim 17, wherein the damping circuit includes a damping element that is configured to be activated and deactivated dependent at least in part on a magnetization state of the inductive storage element.

19. The switching converter as claimed in claim 18, wherein the damping circuit is inductively coupled to the inductive storage element.

* * * * *